United States Patent
Ishizuka et al.

(10) Patent No.: US 7,047,145 B2
(45) Date of Patent: May 16, 2006

(54) COMPENSATION METHOD OF RESOLVER DETECTED POSITION

(75) Inventors: Yoshi Ishizuka, Nagano (JP); Kazuhiro Makiuchi, Nagano (JP); Toru Miyajima, Nagano (JP)

(73) Assignee: Sanyo Denki Co., Ltd., Tokyo (JP)

(*) Notice: Subject to any disclaimer, the term of this patent is extended or adjusted under 35 U.S.C. 154(b) by 0 days.

(21) Appl. No.: 10/893,454

(22) Filed: Jul. 16, 2004

(65) Prior Publication Data
US 2005/0033539 A1 Feb. 10, 2005

(30) Foreign Application Priority Data
Jul. 17, 2003 (JP) ............................. 2003-276286

(51) Int. Cl.
G01C 17/38 (2006.01)
H03K 13/02 (2006.01)
G01R 31/34 (2006.01)

(52) U.S. Cl. .................. 702/94; 324/772; 341/116; 702/189

(58) Field of Classification Search .................. 702/94, 702/151, 189; 318/605, 630; 324/207.25, 324/601, 772; 341/116
See application file for complete search history.

(56) References Cited

U.S. PATENT DOCUMENTS 3,395,350 A * 7/1968 Harac ......................... 324/772
4,134,106 A * 1/1979 Hungerford ................. 341/116
5,710,509 A 1/1998 Goto et al.
5,739,659 A 4/1998 Ezuka
6,239,571 B1 5/2001 Shimahara
6,255,794 B1 7/2001 Staebler
6,389,373 B1 5/2002 Ohya
6,484,120 B1 11/2002 Goto et al.

* cited by examiner

Primary Examiner—John Barlow
Assistant Examiner—John Le
(74) Attorney, Agent, or Firm—Rankin, Hill, Porter & Clark LLP

(57) ABSTRACT

A resolver detected position compensation system for a resolver is provided that can enhance a position detection precision by performing a further compensation on a compensated position that was obtained from a static error compensation. The position detection circuit outputs a compensated detected position signal in which a static error has been compensated. The differential circuit differentiates the compensated detected position signal to obtain a rotational speed of the resolver. Based on a signal representing the rotational speed output from the differential circuit, the phase data memory device and the peak value memory device send the variation in phase and the amplitude peak value, respectively, of the dynamic error signal to the multiplication device. The multiplication device calculates an estimated dynamic error and the subtraction circuit removes the estimated dynamic error from the compensated detected position signal.

4 Claims, 3 Drawing Sheets

COMPENSATION METHOD OF RESOLVER DETECTED POSITION

BACKGROUND OF THE INVENTION

The present invention relates to a method and a system for compensating a detected position detected by a resolver.

Japanese Patent No. 2541169 and Japanese Patent Laid-open Publication No. 7-336979 show conventional techniques for compensating a position detected by a resolver. These prior arts compensate the detected position by performing a static error compensation by which a static error defined as an error from a real position when a rotor of the resolver is at rest, is compensated.

With the conventional technique of Japanese Patent No. 2541169 in particular, as claimed in its claims, the position compensation procedure involves differentiating a detected position signal from the resolver when a motor is driven at a constant speed, calculating from the differentiated signal position compensation data corresponding to rotational positions of the rotor, and storing the calculated result in memory. When a motor is controlled, the position compensation data corresponding to the detected position signal from the resolver is read out from the memory to perform a necessary compensation and the compensated data is used as a position signal. This conventional technique does not perform in advance the static error compensation on the detected position signal which is to be compensated. Thus, the position compensation data obtained by driving the motor at a constant speed is intended for compensating the static error. This is obvious from the following descriptions in the reference cited above. That is, at lines 18–21 in fourth column on page 2 the above patent reads that "speed ripples of large magnitudes are those that appear during one rotation of the rotor as many as the number of pole pairs", provided that a frequency characteristic for the speed control is sufficiently smaller than the pole-pair-number ripples during a constant rotation. The patent also reads at lines 48–49 in third column on page 2 that "in the case of a multi-pole resolver, this compensation needs only to be repeated the same number of times during one machine angle rotation as the number of pole pairs". These descriptions clearly indicate that the errors (ripples) to be compensated are those ripples that appear during one rotation of the rotor as many as the number of pole pairs, i.e., the ripples are static errors.

Further, the Japanese Patent Laid-open Publication No. 7-336979 describes a method of improving errors that uses a compensated speed detection signal and a compensated detected position signal both obtained by compensating the static errors to estimate a delay in signal processing and a position for interpolating between data samplings.

Conventionally only the effect of the static errors of the resolver has been considered and the object to be compensated by the conventional techniques is only the static errors. This is because the rotational speed of conventional motors using the resolver is mostly lower than 5,000 $\text{min}^{-1}$ and in this range of rotational speed no problem arises if only the static errors are compensated. According to the conventional wisdom in the art the resolver needs only to have its static errors compensated. If, for example, the motor rotational speed is about 4,500 $\text{min}^{-1}$, errors pose no particular problem. However, when the rotational speed of the rotor of the resolver exceeds 10,000 $\text{min}^{-1}$, it is found that errors (dynamic errors) occur despite the fact that the static errors of the output of the resolver are compensated. When the rotational speed of the rotor of the resolver increases to 20,000 or 30,000 $\text{min}^{-1}$ for example, the dynamic errors become large, thereby greatly degrading the position detection accuracy. This problem has not been known because the conventional resolver has not been used for position detection at high rotational speeds.

An object of this invention is to provide a resolver detected position compensation method and system which can enhance a position detection accuracy by performing a second compensation on a compensated detected position which has undergone a static error compensation.

Another object of this invention is to provide a resolver detected position compensation method and system which can enhance a detection accuracy of the resolver by eliminating a dynamic error signal which includes twice as many ripples, which appear during one rotation of the rotor running at high speed, as the number of pole pairs of the resolver.

Still another object of this invention is to provide a resolver detected position compensation method and system which can easily and reliably compensate dynamic errors that vary with a change in rotational speed of the resolver rotor.

SUMMARY OF THE INVENTION

The present invention aims at an improvement on a resolver detected position compensation method which performs a static error compensation on a resolver detected position by compensating a static error defined as an error from a real position of a rotor of the resolver that occurs when the rotor is at rest. This invention further performs a dynamic error compensation on the compensated detected position obtained by the static error compensation to eliminate a dynamic error defined as an error from a real position of the rotor that occurs when the rotor is rotating. The dynamic error means an error which, despite the static error compensation, occurs and varies as the rotor rotates. Performing the dynamic error compensation on the compensated detected position obtained by the static error compensation, as proposed in this invention, can eliminate the dynamic error that varies as the rotational speed of the rotor changes. This in turn enhances a resolver position detection accuracy. Particularly, according to this invention, even when the speed of the rotor of the resolver becomes high, the resolver position detection accuracy can be enhanced.

More specifically, whether the rotor is running at low speed or at high speed (e.g., more than 10,000 $\text{min}^{-1}$), the dynamic error includes twice as many ripples that appear during one rotation of the rotor as the number of pole pairs. So, performing a dynamic error compensation, which removes from the compensated detected position signal obtained by the static error compensation a dynamic error signal that contains twice as many ripples that appear during one rotation of the rotor as the number of pole pairs of the resolver, can reliably eliminate the dynamic error from the compensated detected position signal.

Any desired method of dynamic error compensation may be employed. For instance, the dynamic error compensation may be executed as follows. First, a phase of a dynamic error signal that varies according to the rotational position of the rotor is measured in advance at various rotational speeds of the rotor. Further, an amplitude peak value of the dynamic error signal that varies with a speed of the rotor is measured beforehand at various rotational speeds of the rotor. Then, for a particular rotor speed, the corresponding variation in phase and amplitude peak value of the dynamic error signal are multiplied to determine an estimated dynamic error. This estimated dynamic error is subtracted from the compensated detected position signal. With this method, the estimated dynamic error can be determined easily based on the variation in phase and amplitude peak value of the dynamic error signal, both measured beforehand at various speeds of the rotor. Simply subtracting the estimated dynamic error from the compensated detected position signal completes the dynamic error compensation. The entire process of the dynamic error compensation thus can be performed easily and reliably.

A resolver detected position compensation system for a resolver of this invention has a position detection circuit to produce a compensated detected position signal by compensating a static error defined as an error from a real position of the rotor that occurs when the rotor is at rest; and a dynamic error compensation circuit to further compensate the compensated detected position signal by eliminating from the compensated detected position signal a dynamic error defined as an error from a real position of the rotor that occurs when the rotor is rotating.

The dynamic error compensation circuit may be constructed to remove from the compensated detected position signal a dynamic error which includes twice as many ripples that appear during one rotation of the rotor as the number of pair poles of the resolver. More specifically, the dynamic error compensation circuit comprises: a phase data memory means to store dynamic error phase data which is obtained by measuring beforehand a variation in phase of the dynamic error signal that varies according to the rotational position of the rotor at various rotational speeds of the rotor; a peak value memory means to store dynamic error amplitude peak value data which is obtained by measuring beforehand an amplitude peak value of the dynamic error signal that varies with the rotational speed of the rotor at various rotational speeds of the rotor; a differential circuit to determine the rotational speed by differentiating an output of the position detection circuit; a multiplication means to multiply the variation in phase and the amplitude peak value, read from the phase data memory means and the peak value memory means respectively according to an output of the differential circuit, to determine an estimated dynamic error; and a subtraction circuit to subtract the estimated dynamic error from the compensated detected position signal. With this configuration the dynamic error compensation circuit can easily be formed.

As described above, by further performing a dynamic error compensation on the compensated detected position obtained by the static error compensation, the error that varies with a changing speed of the rotor can be compensated, improving the position detection precision over those of the conventional resolvers.

BRIEF DESCRIPTION OF THE DRAWINGS

These and other objects and many of the attendant advantages of the present invention will be readily appreciated as the same becomes better understood by reference to the following detailed description when considered in connection with the accompanying drawings.

DETAILED DESCRIPTION OF PREFERRED EMBODIMENT

Figure 1:
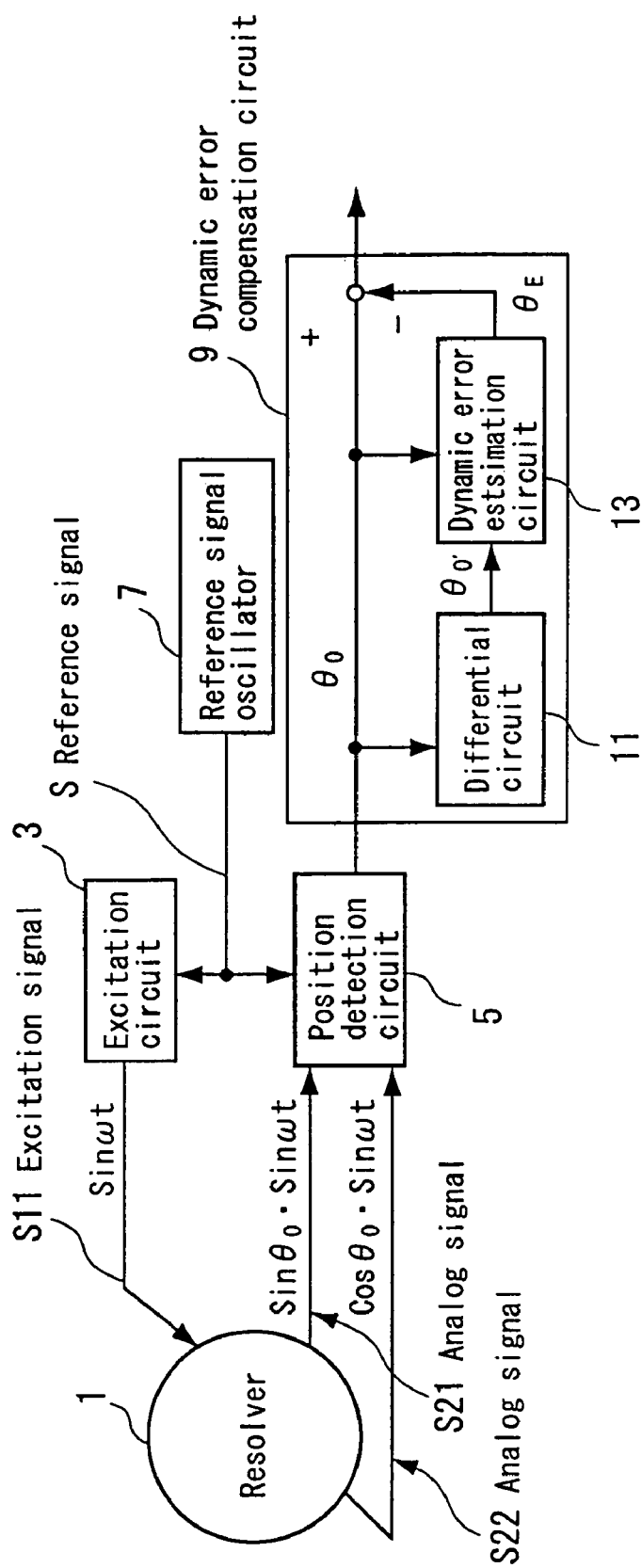
FIG. 1 is a block diagram showing an example construction of a resolver detected position compensation system for a resolver of this invention that implements the method of this invention.

Now one embodiment of this invention will be described by referring to the accompanying drawings. FIG. 1 is a block diagram showing an example construction of a resolver detected position compensation system for a resolver, which embodies the resolver detected position compensation method of this invention.

In FIG. 1, a resolver designated at reference numeral 1 has a rotor and excitation windings both not shown. The resolver 1 is mounted on a rotary shaft of a rotating apparatus such as motor, not shown, and outputs analog signals representing a rotational position of the rotary shaft of the rotating apparatus. To remove not only a static error but also a dynamic error from the detection signal representing the rotor position which is output from the resolver 1, this system has an excitation circuit 3, a position detection circuit 5, a reference signal oscillator 7 to supply a reference signal S to the excitation circuit 3 and the position detection circuit 5, and a dynamic error compensation circuit 9.

When an analog signal sin ωt as an excitation signal S11 is supplied from the excitation circuit 3 to a stationary winding of the resolver 1, the resolver 1 outputs a $\sin\theta_0\cdot\sin\omega t$ as an analog position signal S21 and a $\cos\theta_0\cdot\sin\omega t$ as an analog position signal S22 to the position detection circuit 5. These output signals from the resolver 1 include so-called static errors. The static error is defined as an error from a real position that occurs when the rotor of the resolver 1 is at rest. The static error is caused by slight imbalance that exists in both electromagnetic characteristic of the core composed of electromagnetic steel plates and coil impedance of both the stator and the rotor when the rotor is at rest. This static error is produced in the form of as many ripples, which appear during one complete rotation of the rotor through 360° mechanical angle, as the number of pole pairs of the resolver. The position detection circuit 5 performs a compensation to remove this static error from the output of the resolver 1 and outputs a compensated detected position signal $\theta_0$. The method of compensating the static error is arbitrary. For example, a known compensation method described earlier in the background of the invention may be used.

Figure 2:
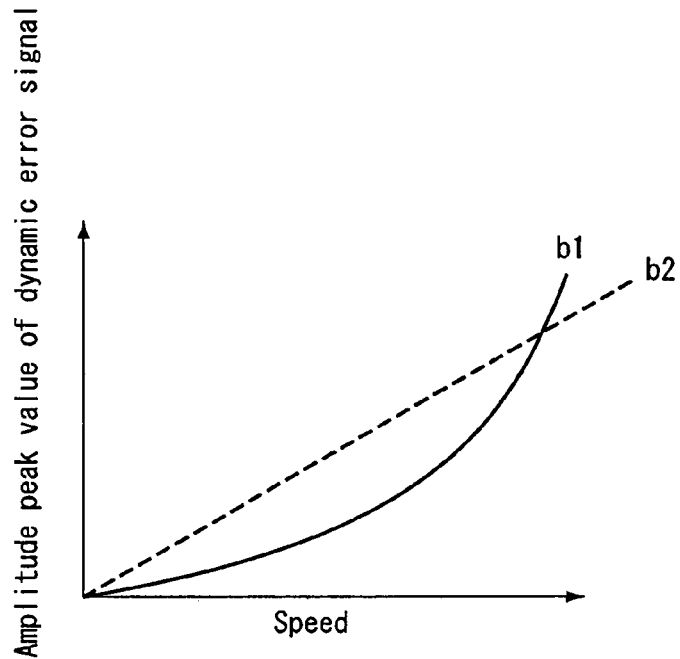
FIG. 2 is a diagram showing an example relation, measured beforehand, between an amplitude peak value of a dynamic error signal and a rotor speed.

The compensated detected position signal $\theta_0$ that was produced by compensating the static error in the output from the position detection circuit 5 includes a dynamic error or dynamic error signal that changes (normally increases) with the rotation of the rotor of the resolver 1. The dynamic error compensation circuit 9 removes a component of this dynamic error (dynamic error signal) from the compensated detected position signal $\theta_0$. This dynamic error varies its phase and amplitude peak value as the rotational speed of the rotor changes. The peak of amplitude of the dynamic error signal tends to increase with the rotational speed of the rotor, as shown in FIG. 2.

Figure 3:
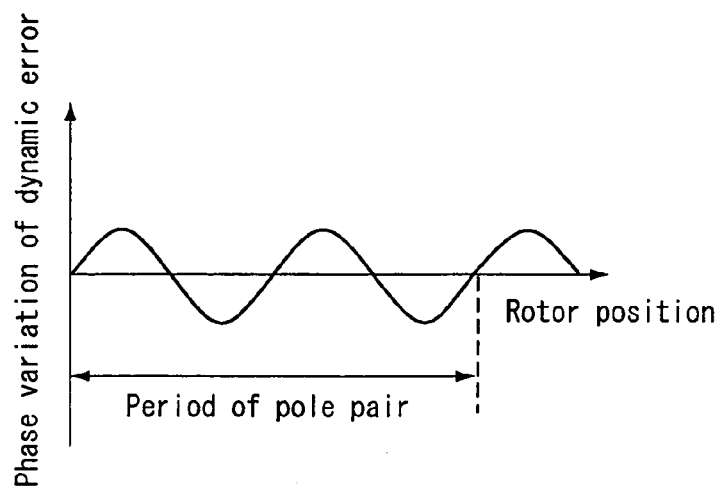
FIG. 3 is a diagram showing an example phase variation data of a dynamic error signal measured in advance at various rotor positions.

The dynamic error component (dynamic error signal) changes or varies its phase relative to the reference position (position with no error) according to the rotational position of the rotor, as shown in FIG. 3. Unlike static errors, the dynamic error contains twice as many ripples, which appear during one rotation of the rotor of the resolver 1, as the number of pole pairs. FIG. 3 shows a reference of a phase variation of the dynamic error with respect to the rotor position at a particular speed. Multiplying the reference of the phase variation as shown in FIG. 3 by the amplitude peak value of the dynamic error at a particular speed as shown in FIG. 2 results in an estimated dynamic error signal.

As for the waveform of the dynamic error component (dynamic error signal) contained in the compensated detected position signal $\theta_0$, an amplitude peak value can be known by, for example, processing a differential signal of the compensated detected position signal $\theta_0$ by an analog FV (frequency-voltage) converter to obtain a speed change, viewing it on an oscilloscope and determining an amount of change. Then, this change is subjected to a fast Fourier cosine-sine transform (FFT) for a frequency analysis to determine a frequency component. This procedure makes it possible to measure the peak value as shown in FIG. 2 and a phase variation waveform of the dynamic error (as shown in FIG. 3) that contains twice as many ripples as the number of pole pairs. For accurate measurement of the amplitude peak of dynamic error at each speed, it is advised to drive the resolver up to a high-speed range, and then to decouple the resolver from a motor and take measurements while the rotor speed of the resolver 1 is being decelerated by inertia.

The dynamic error compensation circuit 9 has a differential circuit 11 to differentiate the compensated detected position signal $\theta_0$ and a dynamic error estimation circuit 13 to estimate a dynamic error. The dynamic error compensation circuit 9 compensates the dynamic error by calculating a dynamic error corresponding to a particular rotation speed of the rotor of the resolver 1 based on data measured beforehand to estimate the dynamic error as an estimated dynamic error and then subtracting the estimated dynamic error from the compensated detected position signal $\theta_0$.

Figure 4:
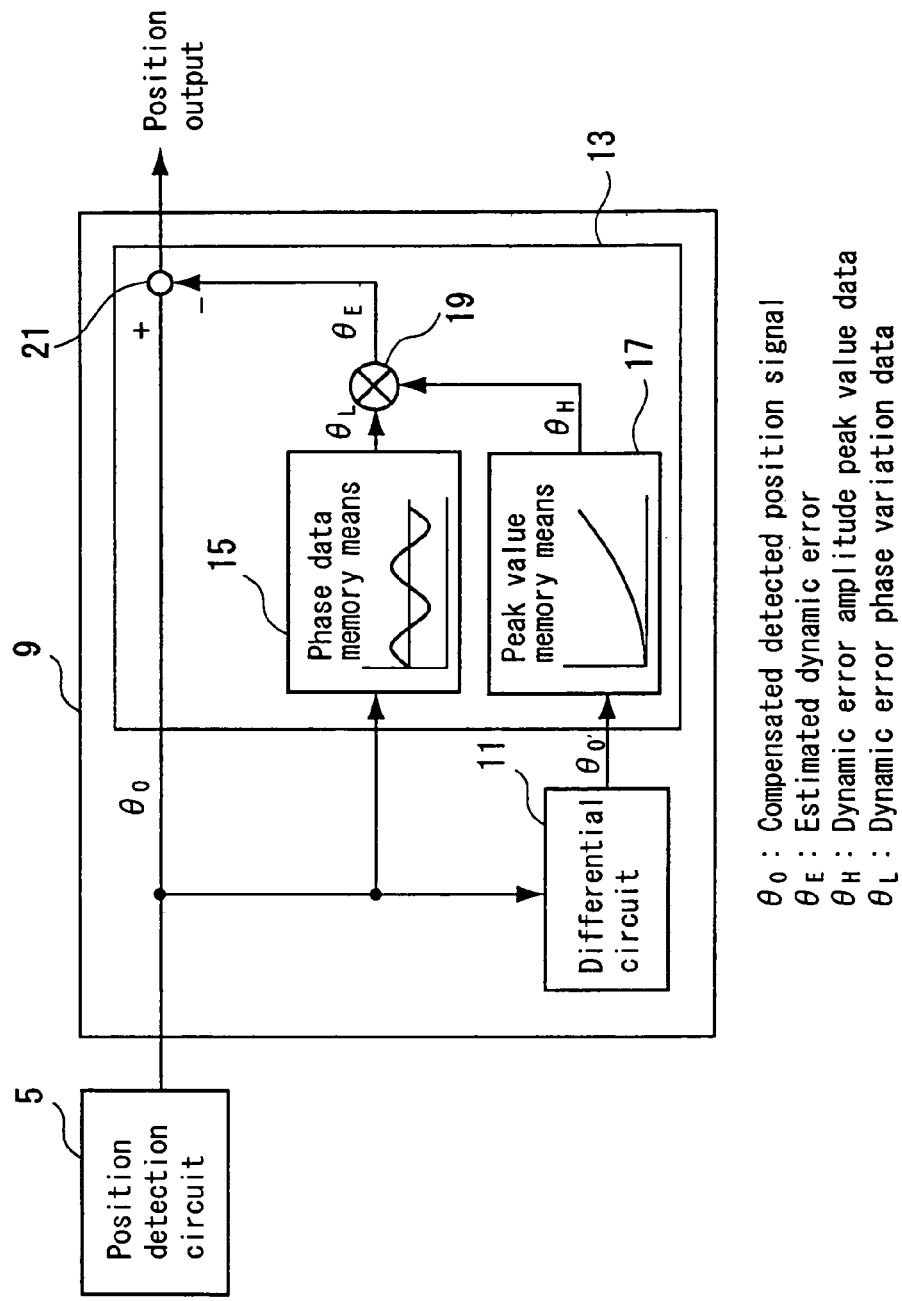
FIG. 4 is a block diagram showing an example dynamic error compensation circuit.

FIG. 4 shows an example construction of the dynamic error compensation circuit 9. The dynamic error estimation circuit 13 has a phase data memory means 15, a peak value memory means 17, and a multiplication means 19 and a subtraction circuit 21. The phase data memory means 15 stores a phase variation of the dynamic error signal, that varies with the rotational speeds of the rotor of the resolver 1, as dynamic error phase data $\theta_L$ in respect of the waveform such as shown in FIG. 3 that was measured beforehand at various rotor positions. The peak value memory means 17 stores a variation of a peak value in amplitude of the dynamic error signal, that varies with the rotational speeds of the rotor, as dynamic error amplitude peak value data $\theta_H$ (characteristic data such as shown in FIG. 2) that was measured in advance at various rotational speeds. The phase data memory means 15 and the peak value memory means 17 output to a multiplication means 19 the dynamic error phase data $\theta_L$ and the dynamic error amplitude peak value data $\theta_H$ that were read out according to the compensated detected position signal $\theta_0$ output from the position detection circuit 5 and the rotor rotational speed signal $\theta_0'$ output from the differential circuit 11. The multiplication means 19 multiplies the dynamic error phase data $\theta_L$ (the phase variation of the dynamic error signal) read from the phase data memory means 15 and the dynamic error amplitude peak value ($\theta_H$) read from the peak value memory means 17 to produce an estimated dynamic error $\theta_E$. The subtraction circuit 21 subtracts estimated dynamic error $\theta_E$ from the compensated detected position signal $\theta_0$ to output a compensated position data from which the dynamic error has been eliminated.

In the above embodiment a test conducted at rotor rotational speeds higher than 10,000 min$^{-1}$ verified that the dynamic errors have mostly been removed from the compensated position data. This permits the resolver to be applied to those rotating machines that are operated at higher speeds than the conventional resolvers have been considered usable. It is of course possible to apply this invention to compensate an output of resolvers running at low rotational speeds at which the conventional resolvers have been operated.

The application of this invention is not limited in terms of resolver construction and excitation system, and the invention can be applied to the compensation of output of resolvers of various constructions or types.

According to this invention it is possible to compensate dynamic errors that increase with an increasing rotational speed of the resolver and to realize a position detection with little error in a range from low to high speed.

Further, the present invention is not limited to this embodiment, but various variations and modifications may be made without departing from the scope of the present invention.

The invention claimed is:

1. A resolver detected position compensation method for compensating a detected position detected by a resolver comprising the steps of:

performing a static error compensation to compensate a static error defined as an error from a real position of a rotor of the resolver that occurs when the rotor is at rest, thereby producing a compensated detected position; and performing a dynamic error compensation on the compensated detected position obtained by the static error compensation to eliminate a dynamic error defined as an error from a real position of the rotor that occurs when the rotor is rotating, wherein the dynamic error compensation comprises the steps of:

measuring beforehand a variation in phase of the dynamic error signal that varies according to the rotational position of the rotor at various rotational speeds of the rotor;

measuring beforehand an amplitude peak value of the dynamic error signal that varies with the rotational speed of the rotor at various rotational speeds of the rotor;

multiplying the variation in phase and the amplitude peak value of the dynamic error signal at a particular rotational speed of the rotor to determine an estimated dynamic error; and subtracting the estimated dynamic error from the compensated detected position signal.

2. A resolver detected position compensation method for compensating a detected position detected by a resolver having a high-speed rotor comprising the steps of:

performing a static error compensation to compensate a static error defined as an error from a real position of the high-speed rotor that occurs when the rotor is at rest, thereby producing a compensated detected position signal; and performing a dynamic error compensation to eliminate a dynamic error signal from the compensated detected position signal, the dynamic error signal including twice as many ripples, which appear during one rotation of the rotor, as the number of pole pairs of the resolver, wherein the dynamic error compensation comprises the steps of:

measuring beforehand a variation in phase of the dynamic error signal that varies according to the rotational position of the rotor at various rotational speeds of the rotor;

measuring beforehand an amplitude peak value of the dynamic error signal that varies with the rotational speed of the rotor at various rotational speeds of the rotor;

multiplying the variation in chase and the amplitude peak value of the dynamic error signal at a particular rotational speed of the rotor to determine an estimated dynamic error; and subtracting the estimated dynamic error from the compensated detected position signal.

3. A resolver detected position compensation system for a resolver comprising:

a position detection circuit to produce a compensated detected position signal by compensating a static error defined as an error from a real position of a rotor of the resolver that occurs when the rotor is at rest; and a dynamic error compensation circuit to further compensate the compensated detected position signal by eliminating from the compensated detected position signal a dynamic error defined as an error from a real position of the rotor that occurs when the rotor is rotating, wherein the dynamic error compensation circuit comprises:

a phase data memory means to store dynamic error phase data which is obtained by measuring beforehand a variation in phase of the dynamic error signal that varies according to the rotational position of the rotor at various rotational speeds of the rotor;

a peak value memory means to store dynamic error amplitude peak value data which is obtained by measuring beforehand an amplitude peak value of the dynamic error signal that varies with the rotational speed of the rotor at various rotational speeds of the rotor;

a differential circuit to determine the rotational speed by differentiating an output of the position detection circuit;

a multiplication means to multiply the variation in phase and the amplitude peak value, read from the phase data memory means and the peak value memory means respectively according to an output of the differential circuit, to determine an estimated dynamic error; and a subtraction circuit to subtract the estimated dynamic error from the compensated detected position signal.

4. A resolver detected position compensation system for a resolver having a high-speed rotor comprising:

a position detection circuit to produce a compensated detected position signal by compensating a static error defined as an error from a real position of the rotor that occurs when the rotor is at rest; and a dynamic error compensation circuit to further compensate the compensated detected position signal by eliminating from the compensated detected position signal a dynamic error including twice as many ripples, which appear during one rotation of the rotor, as the number of pole pairs of the resolver, wherein the dynamic error compensation circuit comprises:

a phase data memory means to store dynamic error phase data which is obtained by measuring beforehand a variation in phase of the dynamic error signal that varies according to the rotational position of the rotor at various rotational speeds of the rotor;

a peak value memory means to store dynamic error amplitude peak value data which is obtained by measuring beforehand an amplitude peak value of the dynamic error signal that varies with the rotational speed of the rotor at various rotational speeds of the rotor;

a differential circuit to determine the rotational speed by differentiating an output of the position detection circuit;

a multiplication means to multiply the variation in phase and the amplitude peak value, read from the phase data memory means and the peak value memory means respectively according to an output of the differential circuit, to determine an estimated dynamic error; and a subtraction circuit to subtract the estimated dynamic error from the compensated detected position signal.

* * * * *

UNITED STATES PATENT AND TRADEMARK OFFICE
CERTIFICATE OF CORRECTION

PATENT NO. : 7,047,145 B2 Page 1 of 1
APPLICATION NO. : 10/893454
DATED : May 16, 2006
INVENTOR(S) : Ishizuka et al.

It is certified that error appears in the above-identified patent and that said Letters Patent is hereby corrected as shown below:

Column 7, Line 9, delete "chase" and insert --phase--.

Signed and Sealed this

Twenty-second Day of August, 2006

JON W. DUDAS
*Director of the United States Patent and Trademark Office*